(12) United States Patent
Chen

(10) Patent No.: US 11,494,233 B2
(45) Date of Patent: *Nov. 8, 2022

(54) BASELINING FOR COMPUTE RESOURCE ALLOCATION

(71) Applicant: Red Hat, Inc., Raleigh, NC (US)

(72) Inventor: Huamin Chen, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/841,671

(22) Filed: Apr. 6, 2020

(65) Prior Publication Data

US 2020/0241993 A1 Jul. 30, 2020

Related U.S. Application Data

(63) Continuation of application No. 15/889,143, filed on Feb. 5, 2018, now Pat. No. 10,613,961.

(51) Int. Cl.
  *G06F 9/50* (2006.01)
  *G06F 11/34* (2006.01)
  *G06F 9/455* (2018.01)

(52) U.S. Cl.
  CPC ........... *G06F 9/50* (2013.01); *G06F 9/455* (2013.01); *G06F 9/45558* (2013.01); *G06F 9/505* (2013.01); *G06F 9/5011* (2013.01); *G06F 9/5044* (2013.01); *G06F 9/5055* (2013.01); *G06F 9/5077* (2013.01);
  (Continued)

(58) Field of Classification Search
  None
  See application file for complete search history.

(56) References Cited

U.S. PATENT DOCUMENTS 8,104,038 B1   1/2012  Graupner
9,983,807 B1 * 5/2018  Tylik ................. G06F 3/0631
                       (Continued)

OTHER PUBLICATIONS

Mars, et al., "Heterogeneity in "Homogeneous" Warehouse-Scale Computers: A Performance Opportunity", 2011, IEEE Computer Society, pp. 29-32. (Year: 2011).*

(Continued)

*Primary Examiner* — Qing Yuan Wu
(74) *Attorney, Agent, or Firm* — Lowenstein Sandler LLP

(57) ABSTRACT

Aspects of the disclosure provide for mechanisms for resource allocation in computer systems. A method of the disclosure may include running, on a plurality of nodes of a computer system, a benchmark workload utilizing a plurality of compute resources, and generating, by a processing device, a plurality of benchmarking results representing performance of the computer system utilizing the plurality of compute resources. The method may further include creating, by the processing device, a resource definition for the compute system in view of the benchmarking results, wherein the resource definition comprises a first resource allocation unit indicative of a first computing capacity of the computer system utilizing a first compute resource and a second resource allocation unit indicative of a second computing capacity of the computer system utilizing a second compute resource, and wherein the plurality of compute resources comprises the first compute resource and the second compute resource.

20 Claims, 7 Drawing Sheets

(52) U.S. Cl.
CPC ............ *G06F 9/5083* (2013.01); *G06F 11/34* (2013.01); *G06F 11/3409* (2013.01); *G06F 11/3414* (2013.01); *G06F 11/3428* (2013.01); *G06F 11/3433* (2013.01)

(56) References Cited

U.S. PATENT DOCUMENTS

| | | |
|---|---|---|
| 2016/0224392 A1 | 8/2016 | Clarke et al. |
| 2017/0017521 A1 | 1/2017 | Gupta et al. |
| 2017/0111241 A1 | 4/2017 | Degioanni |

OTHER PUBLICATIONS

Farley et al., "More for your Money: Exploiting Performance Heterogeneity in Public Clouds", 2012, ACM. (Year: 2012).*
"Docker Micro Benchmark", Kubernetes (GitHub Repository), Nov. 23, 2017, 2 pages.
David Brumley et al., Visualize Kubelet Performance with Node Dashboard, Carnegie Mellon University, Nov. 17, 2016, 6 pages.
Jeff Gensler, "Solving Resource Heterogeneity with Kubernetes Third Party Resources", Dec. 5, 2016, 8 pages.
Sarah Bird, "Optimizing Resource Allocations for Dynamic Interactive Applications", Electrical Engineering and Computer Sciences, University of California at Berkeley, May 16, 2014, 123 pages.
Michael Alan Chang et al., "ThrottleBot—Performance without Insight", UC Berkeley / NYU / ICSI, Nov. 2, 2017, 7 pages.

* cited by examiner

BASELINING FOR COMPUTE RESOURCE ALLOCATION

RELATED APPLICATIONS

This application is a continuation application of U.S. patent application Ser. No. 15/889,143, filed Feb. 5, 2018, now U.S. Pat. No. 10,613,961, which is herein incorporated by reference.

TECHNICAL FIELD

The implementations of the disclosure relate generally to computer systems and, more specifically, to baselining for resource allocation in computer systems.

BACKGROUND

Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include such software components as a kernel and an operating system. Customers, that have installed and are executing their programs "in the cloud," typically communicate with the executing program from remote geographic locations using Internet protocols.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
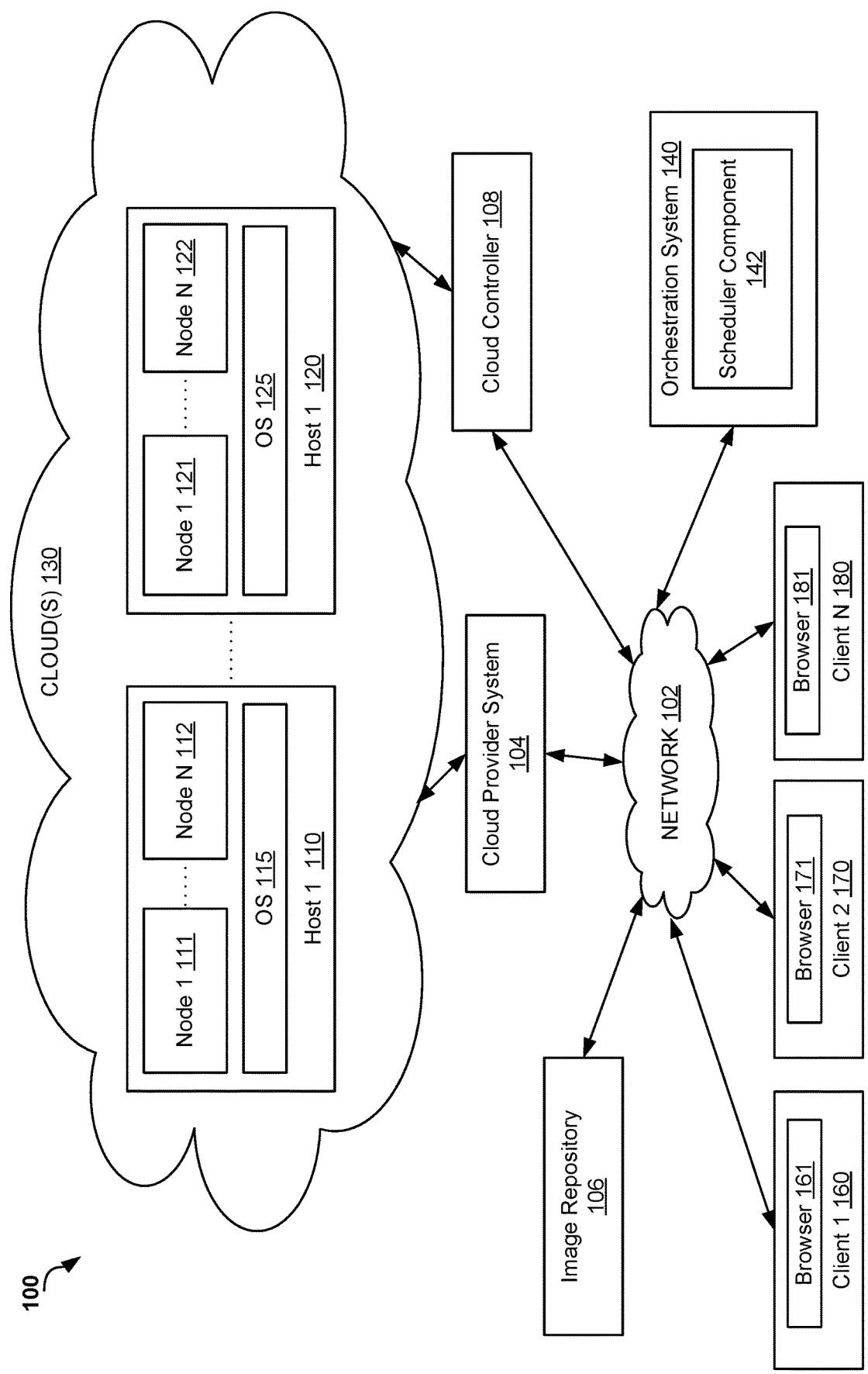
FIG. 1 is a block diagram of a network architecture in which implementations of the disclosure may operate.

Aspects of the disclosure provide for mechanisms for resource allocation in computer systems (e.g., a virtualized environment). Conventional approaches to resource allocation typically allocate compute resources to a user by quantities of compute resources. For example, central processing units (CPU) resources may be allocated in units of cores. As another example, memory resources are allocated in units of bytes.

However, a heterogeneous computing environment may include various computer systems (e.g., clouds) that possess different computing capacities. These computer systems may use different resource presentations for tasks involving resource allocation (e.g., scheduling containers, application deployment, etc.). For example, some computer systems may allocate processing resources (e.g., CPU resources) by CPU (e.g., a CPU core) while other computer systems may allocate processing resources by vCPU (virtual central processing unit). However, these resource presentations do not reveal consistent and meaningful computing capacities of various computer systems. For example, the computing capacities provided by different computer systems utilizing the same amount of compute resource may vary given various models, vendors, clock rates, and other specifications of hardware of the computer systems. A vCPU on a first CPU may or may not deliver the same capacity as a vCPU on a second CPU. Furthermore, the computer systems may have various types of hypervisors. This may pose different levels of performance penalties across various components of the heterogeneous computing environment.

As such, end users of the heterogeneous computing environment do not have clear and consistent views of how their workloads will perform on different computer systems (e.g., clouds, host machines, etc.) utilizing specific amounts of compute resources. This may cause resource over commitment or under commitment and may cause unpredictable performance of applications running in the heterogeneous computing environment.

Aspects of the present disclosure address the above deficiencies and other deficiencies of the conventional resource allocation techniques by providing scheduling mechanisms (e.g., systems, methods, computer-readable medium, etc.) that can perform resource allocation in view of computing capacities of various computer systems. The scheduling mechanisms can perform baselining functions to determine the computing capacities of various components of a heterogeneous computing environment (e.g., clouds). For example, the mechanisms can run a benchmark workload on a computer system of the heterogeneous computing environment to measure computing capacities of the computer system utilizing various compute resources. The benchmark workload may be provided by any suitable benchmarking standard that provides one or more computer benchmark specifications and computer programs for evaluating performance of a computer system (e.g., by determining a performance measure of the computer system). For example, the benchmarking standard may provide a computer program and may define a benchmark specification corresponding to the computer program (e.g., a base runtime duration and a mechanism for determining a performance score in view of the base runtime duration). The computer system may execute the computer program. Data of the execution of the computer program may be analyzed in view of the benchmark specification to determine a score or other performance measure of the computer system. For example, a runtime duration of the execution of the computer program may be compared to the base runtime duration to determine a score for the computer system. The benchmarking standard may include, for example, a STANDARD PERFORMANCE EVALUATION CORPORATION™ ("SPEC") benchmark (e.g., SPECint, SPECfp, etc.)

In one implementation, the scheduling mechanism can deploy one or more containers on each of a plurality of nodes of the computer system and can run the benchmark workload in the containers utilizing a first compute resource (e.g., one CPU core, 1 gigabyte of memory, etc.). In some embodiments, the scheduling mechanism can rerun the benchmark workload in the containers several times. The scheduling mechanism can also monitor data about the containers (e.g., resource utilization, runtime durations, etc.) and generate a first plurality of benchmarking results in view of the monitored data. Each of the first plurality of benchmarking results may include a score representative of performance of one or more of the containers during the execution of the benchmark workload. The first plurality of benchmarking results may be generated in view of the benchmarking standard (e.g., SPECint, SPECfp, etc.). The scheduling mechanism can then generate a resource definition in view of the first plurality of benchmarking results. For example, the scheduling mechanism can determine a first performance score in view of the first plurality of benchmarking results (e.g., by determining an average value of the first plurality of benchmarking results). As such, the first performance score indicates a computing capacity of the computer system utilizing the first compute resource. The scheduling mechanism can then define the first performance score as a first resource allocation unit and associate the first resource allocation unit with the first compute resource. The scheduling mechanism can generate the resource definition to indicate such association. A resource allocation unit as used herein can refer to a compute resource of a computer system that can be requested, allocated, and/or consumed. The compute resource may be and/or include any type of resource that can be utilized by a component of a computer system, such as a processing resource (e.g., CPUs, virtual processing units, etc.), a memory resource (e.g., physical memory, virtual memory, etc.), a storage resource (e.g., storage space available in one or more data storage domains, host computer systems 120, etc.), a network resource (e.g., a network bandwidth), etc.

The scheduling mechanism can iteratively execute the benchmark workload in the containers utilizing various compute resources and can generate additional benchmarking results. For example, the scheduling mechanism can execute the benchmark workload in the containers utilizing a second compute resource (e.g., 2 CPU cores, 2 gigabytes of memory) and can generate a second plurality of benchmarking results. Each of the second plurality of benchmarking results may include a score indicative of performance of one or more of the containers utilizing the second compute resource. The scheduling mechanism can also determine a second performance score in view of the second plurality of benchmarking results (e.g., by determining an average value of the second plurality of benchmarking results). As such, the second performance score indicates a computing capacity of the computer system utilizing the second compute resource. The scheduling mechanism can then update the resource definition to indicate an association between a second resource allocation unit (e.g., the second performance score) and the second compute resource.

To request resource allocation in the heterogeneous computing environment, a user can submit a resource request including information that can be used to identify compute resources in view of the resource definition. For example, the resource request can include a resource allocation unit (e.g., the first resource allocation unit) corresponding to a performance score (e.g., the first performance score). The resource request may also include identifying information of the benchmark that was used to generate the resource allocation unit. The scheduling mechanisms can allocate, in view of the resource definition, a compute resource (e.g., the first compute resource) corresponding to the resource allocation unit to fulfill the resource request.

In some embodiments, the scheduling mechanism can generate multiple resource definitions for various components (e.g., clouds, host machines, etc.) of the heterogeneous computing environment. For example, a first resource definition and a second resource definition may be generated for a first cloud and a second cloud, respectively. In such an example, different compute resources of different computer systems may be allocated to fulfill the resource request described above. For example, the processing device can determine, in view of the first resource definition, that a certain compute resource of the first cloud (e.g., a third compute resource) corresponds to the resource allocation unit and/or that the first cloud can provide the computing capacity corresponding to the resource allocation unit utilizing the third compute resource. The scheduling mechanism can also determine, in view of the second resource definition, that a certain resource of the second cloud (e.g., a fourth compute resource) corresponds to the resource allocation unit and/or that the second cloud can provide the computing capacity corresponding to the resource allocation unit utilizing the second compute resource. In some embodiments, the third compute resource is different from the fourth compute resource. As such, the scheduling mechanism can allocate different compute resources of different computer systems to provide the same computing capacity. The processing device can thus provide consistent and predictable resource allocation in a heterogeneous environment including various resources provided by various resource providers (e.g., cloud providers).

Accordingly, aspects of the present disclosure provide for scheduling mechanisms that can perform resource allocation in view of computing capacities of various computer systems. Unlike the conventional resource allocation techniques that allocate resources in view of an absolute amount of particular resource, the scheduling techniques disclosed herein can provide consistent computing capacities for users of a heterogeneous computing environment at large scale that span across multiple clouds where types of hypervisors and hardware specifications may vary significantly. As a result, the scheduling mechanisms disclosed herein can allocate different compute resources of components of the heterogeneous computing environment to provide the same computing capacity. The scheduling mechanisms can avoid over-committing or under-committing resources of the heterogeneous computing environment.

FIG. 1 is a block diagram of a network architecture 100 in which implementations of the disclosure may operate. In some implementations, the network architecture 100 may be used in a Platform-as-a-Service (PaaS) system, such as OpenShift®. The PaaS system provides resources and services for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems.

As shown in FIG. 1, the network architecture 100 may include a cloud-computing environment 130 (also referred to herein as a cloud) that includes nodes 111, 112, 121, 122 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. In some implementations, the host machines 110, 120 are often located in a data center. For example, nodes 111 and 112 are hosted on physical machine 110 in cloud 130 provided by cloud provider 104. In some implementations, an environment other than a VM may be used to execute functionality of the PaaS applications. When nodes 111, 112, 121, 122 are implemented as VMs, they may be executed by operating systems (OSs) 115, 125 on each host machine 110, 120.

In some implementations, the host machines 110, 120 may be located in a data center. Users can interact with applications executing on the cloud-based nodes 111, 112, 121, 122 using client computer systems, such as clients 160, 170, and 180, via corresponding web browser applications 161, 171, and 181. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in cloud(s) 130. In some implementations, cloud controller 108 receives commands from PaaS system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121, 122. This data may be used for the execution of applications for a multi-tenant PaaS system managed by the PaaS provider controller 140.

In one implementation, the data associated with the application may include data used for execution of one or more containers that include application images built from pre-existing application components and source code of users managing the application. As used herein, an image may refer to data representing executables and files of the application used to deploy functionality for a runtime instance of the application. In one implementation, the image can be built using suitable containerization technologies (e.g., using a Docker tool).

In some embodiments, each of nodes 111, 112, 121, 122 can host one or more containers. Each of the containers may be a secure process space on the nodes 111, 112, 121 and 122 to execute functionality of an application and/or a service. In some implementations, a container is established at the nodes 111, 112, 121 and 122 with access to certain resources of the underlying node, including memory, storage, etc. In one implementation, the containers may be established using the Linux Containers (LXC) method, cgroups, SELinux™, and kernel namespaces, etc. A container may serve as an interface between a host machine and a software application. The software application may comprise one or more related processes and may provide a certain service (e.g., an HTTP server, a database server, etc.). Containerization is an operating-system-level virtualization environment of a host machine that provides a way to isolate the micro-service processes. At the same time, employing the containers makes it possible to develop and deploy new cloud-based micro-services in a cloud-based system. In some embodiments, each node may be and/or include a node 200 of FIG. 2.

Each of nodes 111, 112, 121, 122 can host one or more applications and/or services. Each of the services may correspond to an application and/or one or more components of the application and may provide one or more functionalities of the application. Examples of the services may include a web server, a database server, a middleware server, etc. Each of the services may run as an independent process in a suitable machine (e.g., a container, a virtual machine, a physical machine, etc.). A service running in system 100 may communicate with one or more other services in system 100. In one implementation, an application may be deployed as one or more services on one or more nodes 111, 112, 121, 122. Each of the services may be deployed in one or more containers. In some implementations, a service may be an application.

Figure 7:
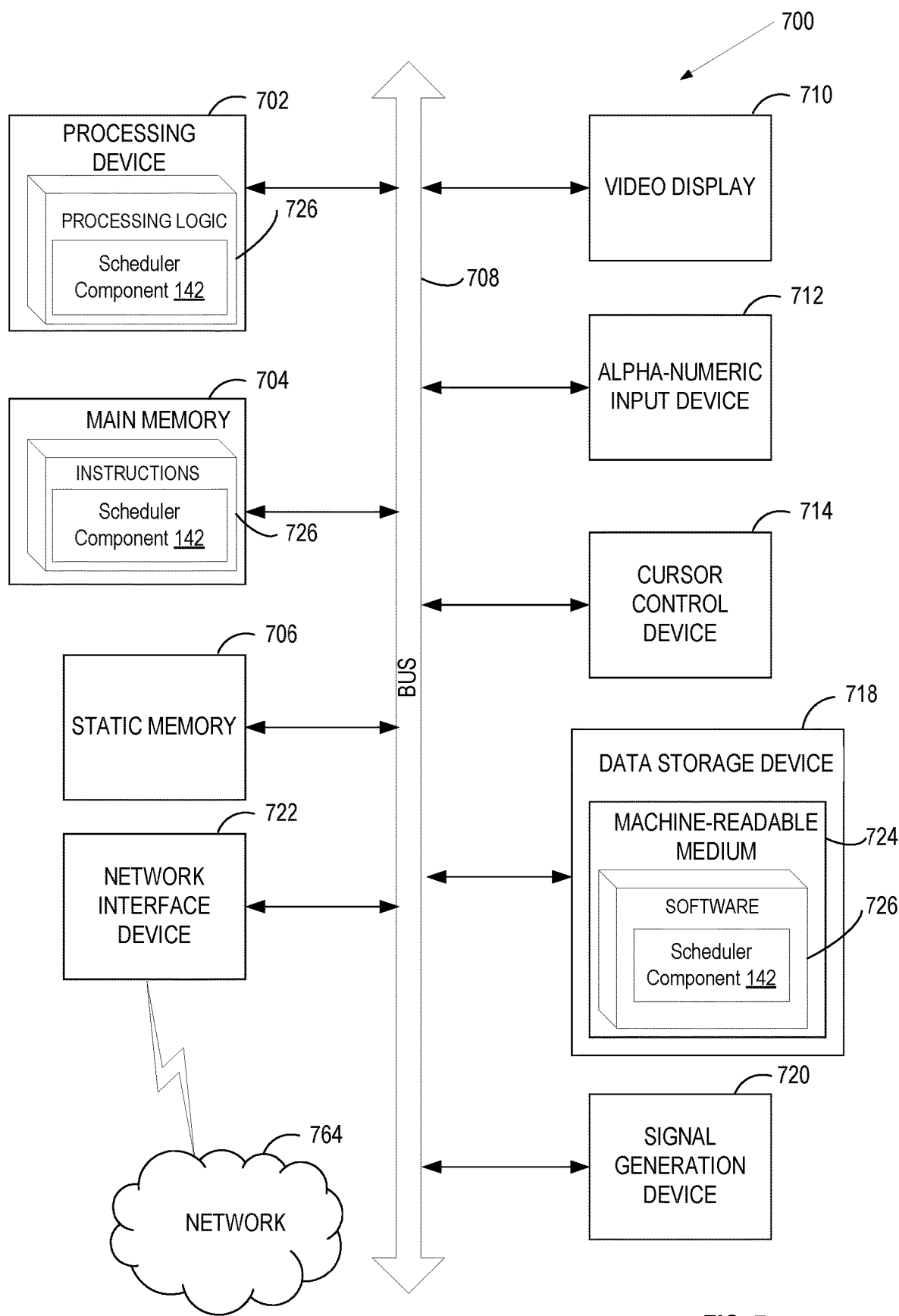
FIG. 7 illustrates a block diagram of one implementation of a computer system.

Orchestration system 140 may provide management and orchestration functions for deploying and/or managing applications and/or services in system 100. For example, orchestration system 140 can build one or more container images for providing functionality of the applications and/or the services. The orchestration system 140 can then create one or more containers to host the application and/or service (e.g., by instructing one or more nodes 111, 112, 121, 122 to instantiate one or more containers from the container image (s)). Orchestration system 140 can include one or more computing devices (e.g., a computing device as shown in FIG. 7). Orchestration system 140 can implement an application programming interface (e.g., a Kubernetes API) to facilitate deployment, scaling, and/or management of containerized software applications.

In some embodiments, orchestration system 140 can deploy an application as one or more services on one or more nodes. Each of the services may be deployed in one or more containers. In some embodiments, a replica of the service may be created by deploying one or more containers on a node (e.g., by deploying a pod as described in connection with FIG. 2 and starting the pods to run the containers).

Figure 2:
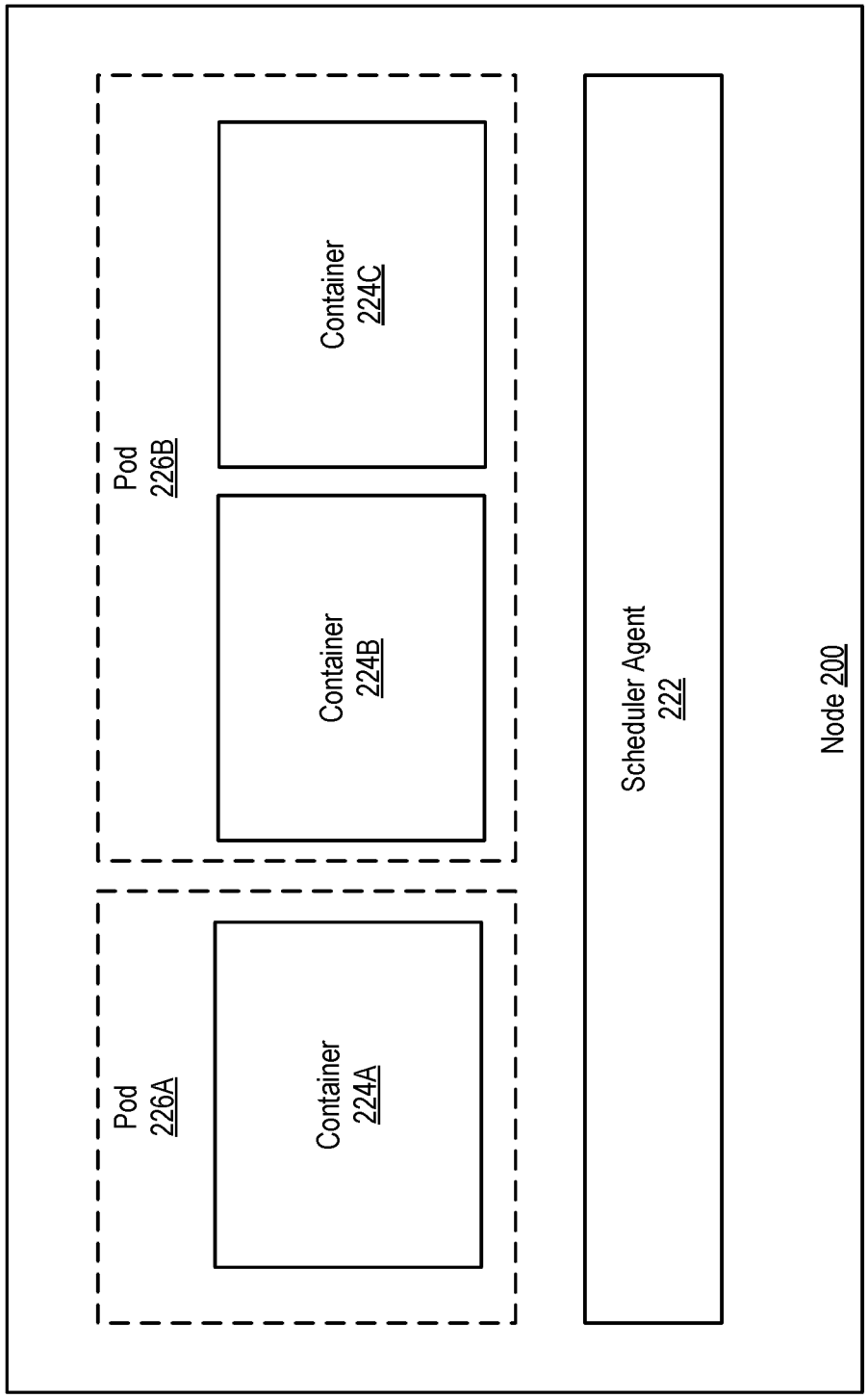
FIG. 2 a block diagram of an example of a node according to an implementation of the disclosure.

Orchestration system 140 can include a scheduler component 142 for scheduling deployments of applications and/or services on nodes 111, 112, 121, 122 and/or to perform any other function for network architecture 100. Scheduler component 142 can collect data about one or more nodes 111, 112, 121, 122 for the deployments and/or other functionality of orchestration system 140. The data may include, for example, data about available compute resources on each of the nodes, data about utilization of compute resources on each of the nodes, data about allocation of compute resources to workloads on each of the nodes, data about containers and/or groups of container (e.g., pods as illustrated in FIG. 2) running on each of the nodes, etc. The data about the containers and/or the groups of container may include, for example, data about resource utilization of the containers and/or the groups of containers, such as data about processing resource usage, data about memory resource usage, etc. In some embodiments, the scheduler component 142 may collect the data by communicating with a scheduler agent (e.g., a scheduler agent 222 of FIG. 2) of a respective node. In some embodiments, the scheduler agent may implement a Kubelet service.

In some embodiments, network architecture 100 can provide a heterogeneous computing environment utilizing various resources. For example, network architecture 100 can include multiple clouds 130 provided by one or more providers. The clouds 130 may or may not provide the same computing capacity. For example, a component of a first cloud (e.g., a first node) and a component of a second cloud (e.g., a second node) may provide different computing capacities. As another example, the first cloud may provide a first computing capacity utilizing a certain compute resource (e.g., a certain processing resource, a certain memory resource, etc.) while the second cloud may provide a second computing capacity utilizing a certain compute resource. The first computing capacity and the second capacity may be different in some embodiments. As such, allocating the same amount of compute resource in the first cloud and the second cloud may provide different computing capacities.

Instead of allocating resources in absolute amounts of the resources, the scheduler component 142 can perform resource allocation and/or scheduling tasks across the clouds in view of computing capacities of various components of network architecture 100. For example, the scheduler component 142 can implement a baselining scheme to assess computing capacities of various components of network architecture 100 utilizing various compute resources. Scheduler component 142 can obtain benchmarking results indicative of computing capacities of the components utilizing the compute resource. Scheduler component 142 can then use the benchmarking results to determine basic resource allocation units.

More particularly, for example, scheduler component 142 can execute a benchmark workload utilizing various compute resources of a computer system (e.g., a cloud 130, a host machine, etc.) in network architecture 100. The benchmark workload may be and/or include any computer program that may be executed to measure a computing capacity of a computer system or one or more components of the computer system. For example, the benchmark workload may include one or more computer programs for measuring performance of integer arithmetic, memory operations, floating-point arithmetic, etc. of the computer system. The benchmark workload may be defined by a benchmarking standard that that provides one or more computer benchmark specifications and computer programs for evaluating performance of a computer system (e.g., by determining a performance measure of the computer system). For example, the benchmarking standard may provide a computer program and may define a benchmark specification (e.g., a base runtime duration and a mechanism for determining a performance score in view of the base runtime duration) corresponding to the computer program. The computer system may execute the computer program. Data of the execution of the computer program may be analyzed in view of the benchmark specification to determine a score or other performance measure of the computer system. For example, a runtime duration of the execution of the computer program may be compared to the base runtime duration to determine a score for the computer system. The benchmarking standard may include, for example, be and/or include a STANDARD PERFORMANCE EVALUATION CORPORATION™ ("SPEC") specification (e.g., SPECint, SPECfp, etc.). The benchmark workload may also be defined by any other suitable benchmarking standard.

In some embodiments, scheduler component 142 can execute the benchmark workload utilizing a first compute resource (e.g., a CPU core, a gigabyte of memory, etc.) on each of a plurality of nodes of the computer system. For example, scheduler component 142 can deploy one or more containers on each of the nodes and run the benchmark workload in the containers. As another example, scheduler component 142 can execute the benchmark workload on a virtual machine of each of the nodes. Scheduler component 142 can also execute the benchmark workload by creating an instance of the benchmark workload on each of the nodes in any other suitable manner. Scheduler component 142 can generate benchmarking results (a first plurality of benchmarking results) representing performance of the computer system during the execution of the benchmark workload utilizing the first compute resource. Each of the benchmarking results may be and/or include a score representative of the performance of the compute resource and can be generated by applying the benchmark (e.g., SPECint, SPECfp, etc.). Scheduler component 142 can also generate a first performance score in view of the first benchmarking results (e.g., by determining an average value of the first benchmarking results). The first performance score may represent the computing capacity of the computer system utilizing the first compute resource.

Scheduler component 142 can then increment the compute resource utilized to execute the benchmark workload. For example, scheduler component 142 can execute the benchmark workload in each of the nodes utilizing a second compute resource. The second compute resource may be greater than the first compute resource. Scheduler component 142 can then generate a second plurality of benchmarking results representing performance of the computer system utilizing the second compute resource. Scheduler component 142 can also determine a second performance score in view of the second plurality of benchmarking results. The second performance score may represent the computing capacity of the computer system utilizing the second compute resource.

In some embodiments, scheduler component 142 can iteratively increment the compute resource utilized to execute the benchmark workload for baselining performance of the computer system as described above. Scheduler component 142 can then generate a resource definition for the computer system in view of benchmarking results corresponding to various compute resources (e.g., the first plurality of benchmarking results, the second plurality of benchmarking results, etc.). The resource definition can include basic resource allocation units that can be used for resource allocation in the computer system. Each of the resource allocation units may indicate a respective computing capacity. In one implementation, each of the resource allocation units may be a performance score generated in view of one or more of the benchmarking results (e.g., the first performance score, the second performance score, etc.). The resource definition can also include mapping data that can be used to map resource allocation units (e.g., performance scores) to compute resources of the computer system (e.g., data indicative of an association between the first performance score and the first compute resource). The mapping data may be stored using any suitable data structure, such as one or more hash tables, search trees, lookup tables, etc.

In some embodiments, scheduler component 142 can generate a respective resource definition for each of a plurality of computer systems (e.g., host machines, clouds, etc.). A given resource allocation unit (e.g., a performance score) may correspond to various compute resources in the computer systems in some embodiments in which the computer systems provide different computing capacities utilizing the same compute resource. For example, a given performance score (e.g., a score of "10") may correspond to a computing capacity that can be provided by a first cloud utilizing a first compute resource or a second cloud utilizing a second compute resource. In such an example, the given performance score may correspond to the first compute resource of the first cloud and the second compute resource of the second cloud.

To request resources in network architecture 100, a user can submit, via a client (e.g., client 160, 170, 180), a resource request including information that can be used to identify compute resources in view of a resource definition associated with a computer system. For example, the resource request can include a resource allocation unit (e.g., a performance score of "10") and identifying information of a benchmark related to the resource allocation unit (e.g., the benchmark used to generate the performance score). The resource request may be and/or include a request to run a workload (e.g., a computer program, an application, a service, etc.). In some embodiments, the user may request to run the workload on any suitable computer system (e.g., a client) to determine the resource allocation unit required to execute the workload. The resource request may be transmitted from the client to the orchestration system 140. Upon receiving the resource request, scheduler component 142 can identify a compute resource to fulfill the resource request. For example, scheduler component 142 can convert the performance score into the first compute resource of first cloud or the second compute resource of the second cloud. Scheduler component 142 can then allocate the identified resource to the user to fulfill the resource request. For example, scheduler component 142 can allocate the first compute resource to one or more containers, virtual machines, etc. on the first cloud. As such, scheduler component 142 can perform resource allocation in view of computing capacities of various clouds or any other computer systems. Unlike the conventional resource allocation techniques that allocate in view of an absolute amount of particular resource, the scheduling techniques disclosed herein can provide consistent computing capacities for users in a heterogeneous computing environment.

In some embodiments, the scheduler component 142 can include one or more components described in connection with FIG. 3 and can implement one or more methods described in connection with FIGS. 4-6.

While various implementations are described in terms of the environment described above, the facility may be implemented in a variety of other environments including a single, monolithic computer system, as well as various other combinations of computer systems or similar devices connected in various ways. For example, the scheduler component 142 and/or one or more portions of the scheduler component 142 may be running on a node, such as nodes 111, 112, 121, 122, of the system 100 hosted by cloud 130, or may execute external to cloud 130 on a separate server device. In some implementations, the scheduler component 142 may include more components that what is shown that operate in conjunction with the PaaS system of network 100.

FIG. 2 is a block diagram of an example 200 of a node according to an implementation of the disclosure. Node 200 can be a system providing run-time environments for one or more containers. Node 200 may comprise a computing device with one or more processors communicatively coupled to memory devices and input/output (I/O) devices, as described in more details herein below with references to FIG. 7. Node 200 may include an operating system (not shown in FIG. 2) with one or more user space programs. The operating system may be any program or combination of programs that are capable of using the underlying computing device to perform computing tasks. The operating system may include a kernel comprising one or more kernel space programs (e.g., memory driver, network driver, file system driver) for interacting with virtual hardware devices or actual hardware devices (e.g., para-virtualization). User space programs may include programs that are capable of being executed by the operating system and in one example may be an application program for interacting with a user. Although node 200 comprises a computing device, the term "node" may refer to the computing device (e.g., physical machine), a virtual machine, or a combination thereof.

Node 200 may provide one or more levels of virtualization such as hardware level virtualization, operating system level virtualization, other virtualization, or a combination thereof. Node 200 may provide hardware level virtualization by running a hypervisor that provides hardware resources to one or more virtual machines. The hypervisor may be any program or combination of programs and may run on a host operating system or may run directly on the hardware (e.g., bare-metal hypervisor). The hypervisor may manage and monitor various aspects of the operation of the computing device, including the storage, memory, and network interfaces. The hypervisor may abstract the physical layer features such as processors, memory, and I/O devices, and present this abstraction as virtual devices to a virtual machine.

Node 200 (e.g., physical machine or virtual machine) may also or alternatively provide operating system level virtualization by running a computer program that provides compute resources to one or more containers 224A-C. Operating system level virtualization may be implemented within the kernel of operating system and may enable the existence of multiple isolated containers. In one example, operating system level virtualization may not require hardware support and may impose little to no overhead because programs within each of the containers may use the system calls of the same underlying operating system. This enables node 200 to provide virtualization without the need to provide hardware emulation or be run in an intermediate virtual machine as may occur with hardware level virtualization.

Operating system level virtualization may provide resource management features that isolate or limit the impact of one container (e.g., container 224A) on the resources of another container (e.g., container 224B or 224C). The operating system level virtualization may provide a pool of resources that are accessible by container 224A and are isolated from one or more other containers (e.g., container 224B). The pool of resources may include file system resources (e.g., particular volume), network resources (e.g., particular network address), memory resources (e.g., particular memory portions), other compute resources, or a combination thereof. The operating system level virtualization may also limit a container's access to one or more compute resources by monitoring the containers activity and restricting the activity in view of one or more limits (e.g., quotas). The limits may restrict the rate of the activity, the aggregate amount of the activity, or a combination thereof. The limits may include one or more of disk limits, input/out (I/O) limits, memory limits, CPU limits, network limits, other limits, or a combination thereof. In one example, an operating system virtualizer provides the compute resources to containers 224A-C. The operating system virtualizer may wrap an application in a complete file system that contains the code, runtime, system tools, system libraries and other programs installed on the node that can be used by the application. In one example, the operating system virtualizer may be the same or similar to Docker for Linux®, ThinApp® by VMWare®, Solaris Zones® by Oracle®, or other program that automates the packaging, deployment, and execution of applications inside containers.

Each of the containers 224A-C may refer to a resource-constrained process space of node 200 that can execute functionality of a program. Containers 224A-C may be referred to as a user-space instances, a virtualization engines (VE), or jails and may appear to a user as a standalone instance of the user space of an operating system. Each of the containers 224A-C may share the same kernel but may be constrained to only use a defined set of compute resources (e.g., CPU, memory, I/O). Aspects of the disclosure can create one or more containers to host a framework or provide other functionality of an application (e.g., proxy agent functionality, database functionality, web application functionality, etc.) and may therefore be referred to as "application containers."

Pods 226A and 226B may be data structures that are used to organize one or more containers 224A-C and enhance sharing between containers, which may reduce the level of isolation between containers within the same pod. Each pod may include one or more containers that share compute resources with another container associated with the pod. Each pod may be associated with a unique identifier, which may be a networking address (e.g., an IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same node 200. In another example, the containers associated with a particular pod may be located on different nodes that are on the same or different physical machines. Node 200 can have any suitable number of pods. Each of the pods may have any suitable number of containers.

In some embodiments, node 200 may host one or more applications and/or services. For example, node 200 can host service replicas for one or more applications and/or services. Each of the services may correspond to an application. Each of the service replicas may be a copy of a service and may run as an independent process in one or more containers 224A-C. In one implementation, each of pods 226A and 226B may host a respective service replica. The service replicas hosted by pods 226A and 226B may or may not correspond to the same service and/or application.

Node 200 can include a scheduler agent 222 that can create, start, stop, manage, etc. one or more of the containers and/or pods on node 200. In some embodiments, scheduler agent can implement a Kubelet service.

Scheduler agent 222 can also monitor statuses of node 200, containers 224A-C, and/or pods 226A-B and can transmit data about the statuses to the scheduler component 142 of FIG. 2. A status of the node (also referred to as the "node status") may include any data about compute resources of the node and/or one or more components of the node (e.g., a container, a pod) in a certain period of time, data about an application or service running on the node (e.g., a runtime of the application), and/or any other data about the node. For example, the node status may include data about resource usage by the node, one or more containers running on the node, one or more pods running on the node, such as an amount of a compute resource utilized by the node, the container(s), the pods, or the application during a certain period of time, a type of the compute resource (e.g., a processing resource, a memory resource, etc.), etc. A status of a container (also referred to as the "container status") may include any data about compute resources associated with the container (e.g., resource usage by the container in a certain time period of time, an available compute resource, etc.), data about an application and/or service running in the container, and/or any other data about the container. A status of a pod (also referred to as the "pod status") may include any data about compute resources associated with the pod (e.g., resource usage by the pod in a certain period of time), data about an application and/or service running in the pod, and/or any other data about the pod. In some embodiments, the data about the node status, the container status, and/or the pod status may be transmitted to the scheduler component 142 periodically, at random time instances, or in any other suitable interval. In some embodiments, the data about the node status, the container status, and/or the pod status may be transmitted to the scheduler component 142 in response to receiving a request for the data from the scheduler component 142.

Scheduler agent 222 can relay other information to and from the scheduler component 142 and/or any other component of orchestration system 140. For example, scheduler agent 222 can receive commands, manifests, etc. for deploying and/or managing containers and/or pods on node 200. The commands may include, for example, a command to deploy a container, a command to deploy a pod, a command to deploy a service and/or an application, a command to allocate a given compute resource to one or more containers, pods, or nodes, a command to execute a workload utilizing the compute resource, etc. The manifests may include, for example, a container manifest including properties of a container or a pod (e.g., one or more container images, one or more containers to be deployed, commands to execute on boot of the container(s), ports to enable upon the deployment of the container(s), etc.). In some embodiments, scheduler agent 222 can deploy a container and/or a pod on node 200 in view of the commands, manifests, and/or any other data provided by scheduler system 140.

Figure 3:
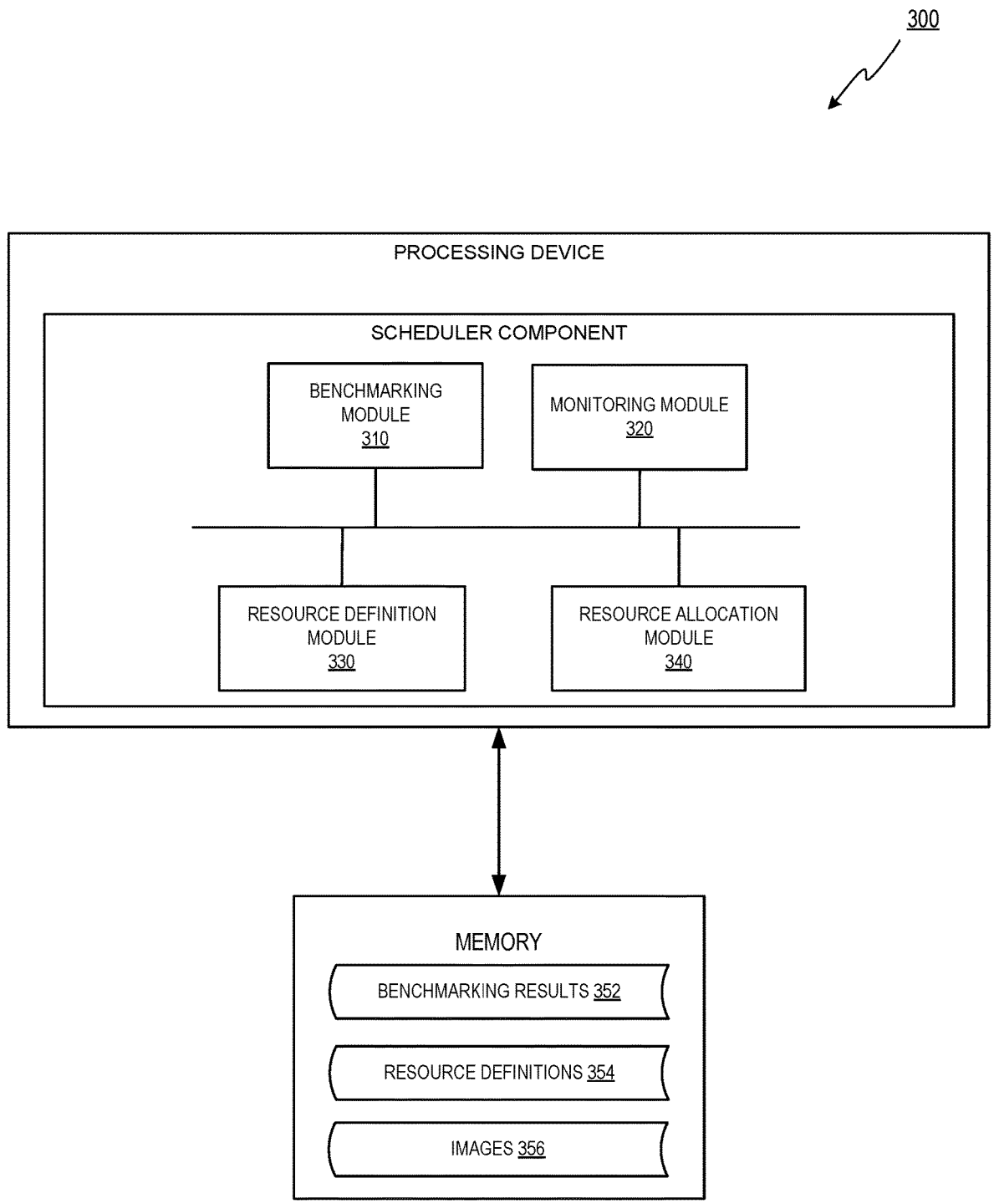
FIG. 3 depicts a block diagram of a computer system operating in accordance with one or more aspects of the present disclosure.

FIG. 3 depicts a block diagram of a computer system 300 operating in accordance with one or more aspects of the present disclosure. Computer system 300 may be the same or similar to orchestration system 140 of FIG. 1 and may include one or more processing devices and one or more memory devices. In the example shown, computer system 300 may include a processing device comprising a benchmarking module 310, a monitoring module 320, a resource definition module 330, and a resource allocation module 340 and/or any other suitable component for implementing resource allocation mechanisms and/or perform any other suitable function in accordance with the present disclosure.

Benchmarking module 310 can perform benchmarking and/or baselining functions to assess performance and/or computing capacities of one or more computer systems (e.g., one or more components of network architecture 100 of FIG.

1). In some embodiments, for each of the computer systems, benchmarking module 310 can assess computing capacities of the computer system utilizing various compute resources. For example, benchmarking module 310 can execute a benchmark workload on a plurality of nodes of the computer system utilizing the various compute resources. In one implementation, benchmarking module 310 can execute the benchmark workload on each of the nodes utilizing an initial compute resource, such as a first compute resource comprising a first processing resource (e.g., 1 CPU core), a first memory resource (e.g., 1 gigabyte of memory), and/or any other suitable resource. Benchmarking module 310 can generate first benchmarking results representing performance of the computer system utilizing the first compute resource. Benchmarking module 310 can then iteratively increment the compute resource utilized to execute the benchmark workload to obtain additional benchmarking results representing performance of the computer system utilizing additional resources. For example, benchmarking module 310 can generate second benchmarking results representing performance of the computer system utilizing a second compute resource.

Monitoring module 320 can monitor compute resources that can be utilized by various components of a computer system (e.g., system 100, a host computer system, a node, a container, a pod, etc.). Examples of the compute resources (also referred to as the "resources") may include processing resources (e.g., CPUs, virtual processing units, etc.), memory resources (e.g., physical memory, virtual memory, etc.), storage resources (e.g., storage space available in one or more data storage domains, host computer systems 120, etc.), network resources (e.g., a network bandwidth), etc.

In one example, monitoring module 320 may collect data related to resource usage in the computer system. In one example, the data may include information about resources consumed by one or more components of the computer system (e.g., storage space, memory, network bandwidths, etc. consumed by one or more containers, groups of containers, VMs, hosts, etc.). In another example, the data may include information related to input/output (I/O) operations (e.g., write operations, read operations, etc.) performed by one or more components of the computer system. In a further example, the data may include information related to compute resources that can be provided by one or more components of the computer system (e.g., storage space provided by one or more data storage domains, host computer systems, etc.). Monitoring module 210 may collect the data by polling a host, a node, a pod, or any other component of the computer system for the data periodically, at random intervals, responsive to an event (e.g., a user request for allocation resources to a VM), and/or in any other suitable manner.

In some embodiments, monitoring module 320 can monitor resource usage and/or performance of one or more components of the computer system running a specific workload (e.g., a benchmark workload). For example, monitoring module 320 can collect data about resource utilization and/or runtime of an execution of the workload in a container, a group of containers, a node, etc. of the computer system. The data may include, for example, a runtime duration of the execution, an amount of a compute resource consumed during the execution of the workload, etc.

Resource definition module 330 can process the benchmarking results provided by benchmarking model 310 to create a resource definition. For example, resource definition module 330 can determine whether the first plurality of benchmarking results satisfy a predefined condition. The satisfaction of the predefined condition may indicate that the computer system can provide a predictable and consistent computing capacity utilizing the first compute resource. For example, the predefined condition may include that the first plurality of benchmarking results are within a predefined range. As another example, the predefined condition may include that a deviation of the first plurality of benchmarking results is not greater than a threshold value.

In response to determining that the predefined condition is not satisfied, resource definition module 330 can determine that the allocation of the first compute resource is not to achieve predictable and consistent performance and can generate data to indicate such determination.

Alternatively, resource definition module 320 can determine the resource definition in view of the first plurality of benchmarking results in response to determining that the predefined condition is satisfied. As such, resource definition module 320 can avoid over commitment or under commitment during resource allocation by using benchmarking results that satisfy the predefined condition to generate the resource definition. In some embodiments, resource definition module 320 can determine a performance score in view of the first plurality of benchmarking results. The performance score may be an average value of the benchmarking results (e.g., a mean, median, mode, etc.), one of the benchmarking results, an average value of a subset of the benchmarking results (e.g., a set of selected benchmarking results), and/or any other value that can represent the first plurality of benchmarking results. Resource definition module 320 can then associate the performance score with the first compute resource and can generate the resource definition to indicate such association.

Resource allocation module 340 can allocate resources of the computer system. In one implementation, resource allocation module 340 may receive, from a client device 101, a resource allocation request. The resource request may be and/or include a request for allocation of a resource associated with a particular computing capacity (e.g., a performance score generated utilizing a benchmark workload defined by a benchmarking standard). In one example, the request may be and/or include a request to create and/or deploy the virtual machine on a computer system. In another example, the resource request may be and/or include a request to allocate additional resource to the virtual machine running on a host computer system. In still another example, the resource request may be and/or include a request to create a virtual disk, a virtual network interface, and/or any other device using the requested resource.

The resource request may include information that can be used to identify compute resources in view of a resource definition associated with a computer system. For example, the resource request can include a resource allocation unit (e.g., a performance score of "10") and identifying information of a benchmark related to the performance score (e.g., the benchmark used to generate the performance score). Upon receiving the resource request, resource allocation module 340 can identify a compute resource to fulfill the resource request. For example, resource allocation module 340 can convert the performance score into a certain compute resource of the computer system associated with the performance score. Resource allocation module 340 can also determine that the computer system can provide a computing capacity corresponding to the performance score utilizing the identified compute resource. Resource allocation module 340 can then allocate the identified resource to fulfill the resource request. For example, resource allocation module 340 can deploy one or more containers on the computer system to host an application and/or service for the service and can allocate the identified compute resource to the containers.

Computer system 300 can also include one or more memory devices storing benchmarking results 352, resource definition 354, and image data 356. Benchmarking results 352 can include multiple sets of benchmarking results corresponding to various compute resources (e.g., the first plurality of benchmarking results corresponding to the first compute resource, a second plurality of benchmarking results corresponding to a second compute resource, etc.).

Resource definition 354 may include any data about the resource definition generated as described above. Resource definition 354 can include mapping data that can be used to map performance scores. The mapping data may be stored using any suitable data structure that can be used to map performance scores to compute resources, such as one or more hash tables, search trees, lookup tables, etc.

The memory devices can also store image data 356 for deployment of services and/or applications in computer system 300. Image data 356 can include one or more images that may be any data structure for storing and organizing information that may be used by a node to provide a computing service. The information within an image of image data 356 may indicate the state of the image and may include executable information (e.g., machine code), configuration information (e.g., settings), or content information (e.g., file data, record data). Each of the images may be capable of being loaded onto a node and may be executed to perform one or more computing tasks. Image data 356 may include one or more container images, virtual machine images, disk images, other images, or a combination thereof. A container image may include a user space program (e.g., application) along with a file system that contains the executable code, runtime, system tools, system libraries and other programs to support the execution of the user space program on a node. In some embodiments, the container image does not include an operating system but may be run by an operating system virtualizer that is part of an existing operating system of the node. In some embodiments, a container image may be used to deploy a container on a node (e.g., by creating and instantiating the container from the container image). A virtual machine image may include both an operating system and one or more user space programs. The virtual machine image may be loaded onto the node and may be run by a hypervisor. A disk image may be the same or similar to a virtual machine image (e.g., virtual disk image) but may be loaded onto node 120 and run without using a hypervisor or other form of virtualization technology. In one example, an image may be generated by creating a sector-by-sector copy of a source medium (e.g., hard drive of example machine). In another example, a disk image may be generated based on an existing image and may be manipulated before, during, or after being loaded and executed. In some embodiments, a virtual machine image and/or a disk image may be used to instantiate a service replica or an application replica on a node.

Figure 4:
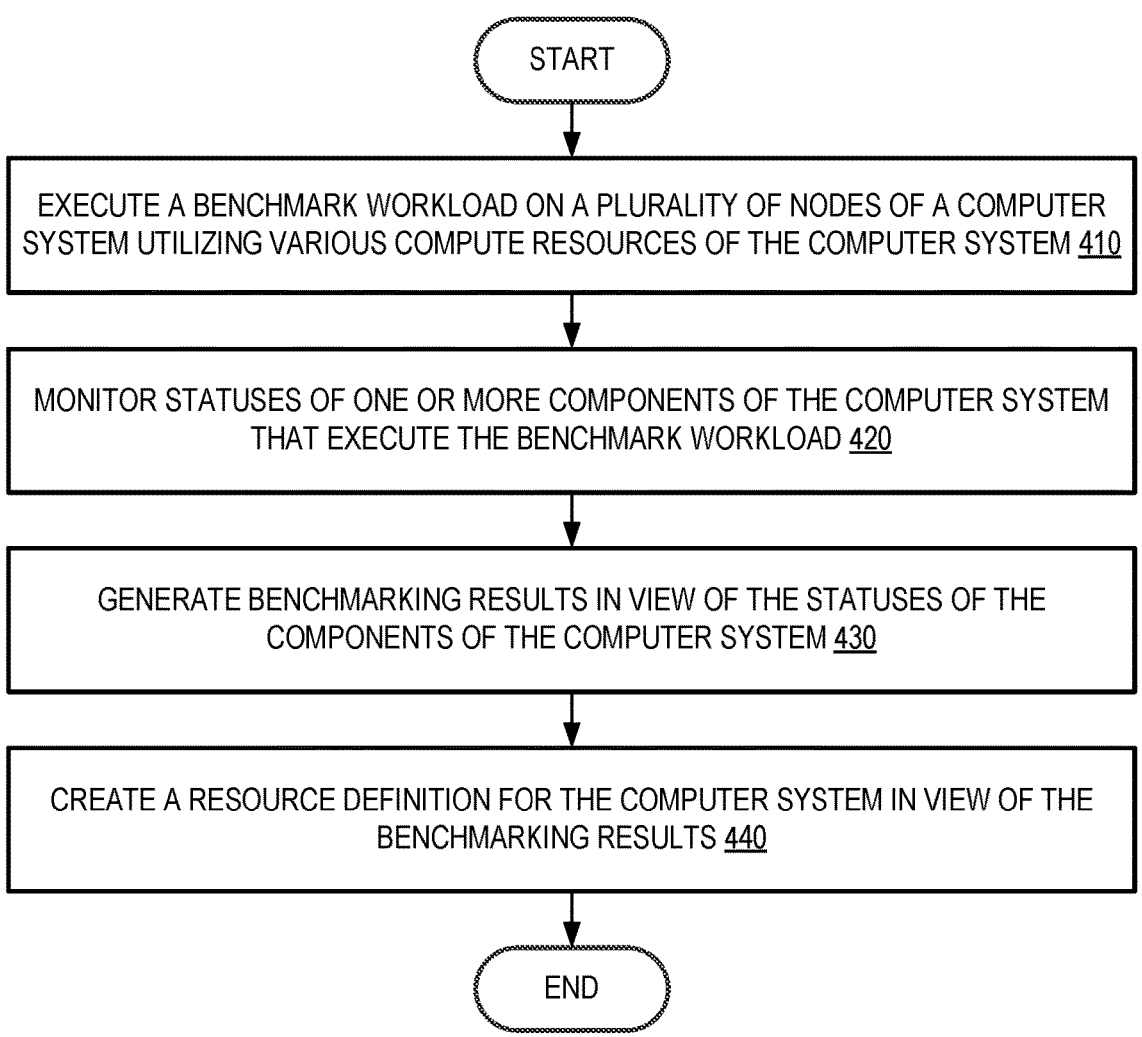
FIG. 4 is a flow diagram illustrating a method of baselining for resource allocation in a computer system according to an implementation of the disclosure.

FIG. 4 is a flow diagram illustrating a method 400 for baselining for compute resource allocation according to an implementation of the disclosure. Method 400 can be performed by processing logic that may comprise hardware (e.g., circuitry, dedicated logic, programmable logic, microcode, etc.), software (such as instructions run on a processing device), firmware, or a combination thereof. In one implementation, method 400 is performed by a processing device (e.g. a processing device 702 of FIG. 7) implementing a scheduler component as described in connection with FIGS. 1-3.

Method 400 may begin at block 410 where the processing device can execute a benchmark workload on a plurality of nodes of a computer system utilizing various compute resources. In one implementation, the execution of the benchmark workload may be initiated in response to determining, by the processing device, that a resource definition has not been associated with the computer system. In another implementation, the execution of the benchmark workload may be initiated in response to receiving a request for resource definition by the processing device. The request for resource definition may be originated from a client device, a server (e.g., a server of a cloud provider system 104, an orchestration system 140, etc. of FIG. 1), and/or any other device. The computer system may include, for example, one or more host machines, clouds, and/or any other component as described in connection with FIG. 1. In some embodiments, the computer system may be a cloud provided by a service provider.

The benchmark workload may be and/or include any computer program that may be executed to measure a computing capacity of a computer system or one or more components of the computer system. The benchmark workload may be defined by a benchmarking standard that provides one or more computer programs for accessing performance characteristics of a computer system. For example, the benchmark may be and/or include a SPEC benchmark (e.g., SPECint, SPECfp, etc.). The benchmark workload may also be defined by any other suitable benchmark.

The benchmark workload may be executed on each of the nodes or each of a subset of the nodes (e.g., a plurality of selected nodes). For example, the processing device can create an instance of the benchmark workload on each of the nodes. In one implementation, the benchmark workload may be executed on each of a plurality of containers or groups of containers (e.g., pods) running on the nodes. In another implementation, the benchmark workload may be executed in each of a plurality of virtual machines running on the nodes.

The benchmark workload may be executed utilizing various compute resources of the computer system. For example, the processing device can execute the benchmark workload in the computer system utilizing an initial amount of compute resource, such as a first compute resource comprising a first processing resource (e.g., one CPU core), a first memory resource (e.g., 1 gigabytes of memory), and/or any other suitable resource. The processing device can then increment the initial amount of compute resource and can execute the benchmarking workload in the computer system utilizing more compute resources, resulting in a second compute resource that is greater than the first compute resource. The second compute resource may be and/or include a second processing resource (e.g., two CPU cores), a second memory resource (e.g., 2 gigabytes of memory), etc. In some embodiments, the processing device can iteratively increment the compute resource to be utilized to execute the benchmark workload in the computer system to identify a resource allocation model for the computer system. For example, the processing device can identify multiple predetermined resource allocation units (e.g., performance scores) associated with the resource allocation model. The processing device can then identify the resource allocation model by identifying a compute resource as described above for each of the predetermined resource allocation units.

The benchmark workload may be executed on the nodes of the computer system several times (e.g., a predetermined number of times) utilizing a particular compute resource. For example, the processing device can run the benchmark workload several times in each of the containers, the pods, etc. utilizing the first compute resource.

At block 420, the processing device can monitor statuses of one or more components of the computer system that execute the benchmark workload. For example, the processing device can monitor resource usage of one or more components of the computer that execute the benchmark workload (e.g., one or more containers, pods, virtual machines, nodes, etc.). The resource usage may be and/or include, for example, CPU usage, memory usage, etc. of the components of the computer system. The statuses of the components (e.g., a node status, container status, pod status, etc.) may also include runtime durations of the executions of the benchmark workload by the components of the computer system.

At block 430, the processing device can generate benchmarking results in view of the statuses of the components of the computer system. Each of the benchmarking results may indicate performance of the computer system or the components of the computer system running the benchmark workload utilizing a given compute resource. For example, each of the benchmarking results may be and/or include a performance score determined by applying the benchmark.

The benchmarking results may correspond to executions of the benchmark workload utilizing the various compute resources. For example, the benchmarking results may include multiple subsets of results, each of which may correspond to a given compute resource. In one implementation, the benchmarking results may include a first plurality of benchmarking results representing performance of the computer system running the benchmark workload utilizing the first compute resource. The benchmarking results may include a second plurality of benchmarking results representing performance of the computer system running the benchmark workload utilizing the second compute resource.

At block 440, the processing device can create a resource definition for the computer system in view of the benchmarking results. The resource definition may include, for example, resource allocation units that can be used for resource allocation in the computer system. The basic resource allocation unit may be a performance score generated in view of the benchmarking results. For example, a first performance score may be generated in view of the first plurality of benchmarking results. The first performance score may be, for example, an average value of the first plurality of benchmarking results. The processing device can associate the first performance score with the first compute resource and can generate the resource definition to indicate such association. Similarly, the processing device can determine a second performance score in view of a second plurality of benchmarking results. The processing device can generate the resource definition to indicate an association between the second performance score and the second compute resource.

Figure 5:
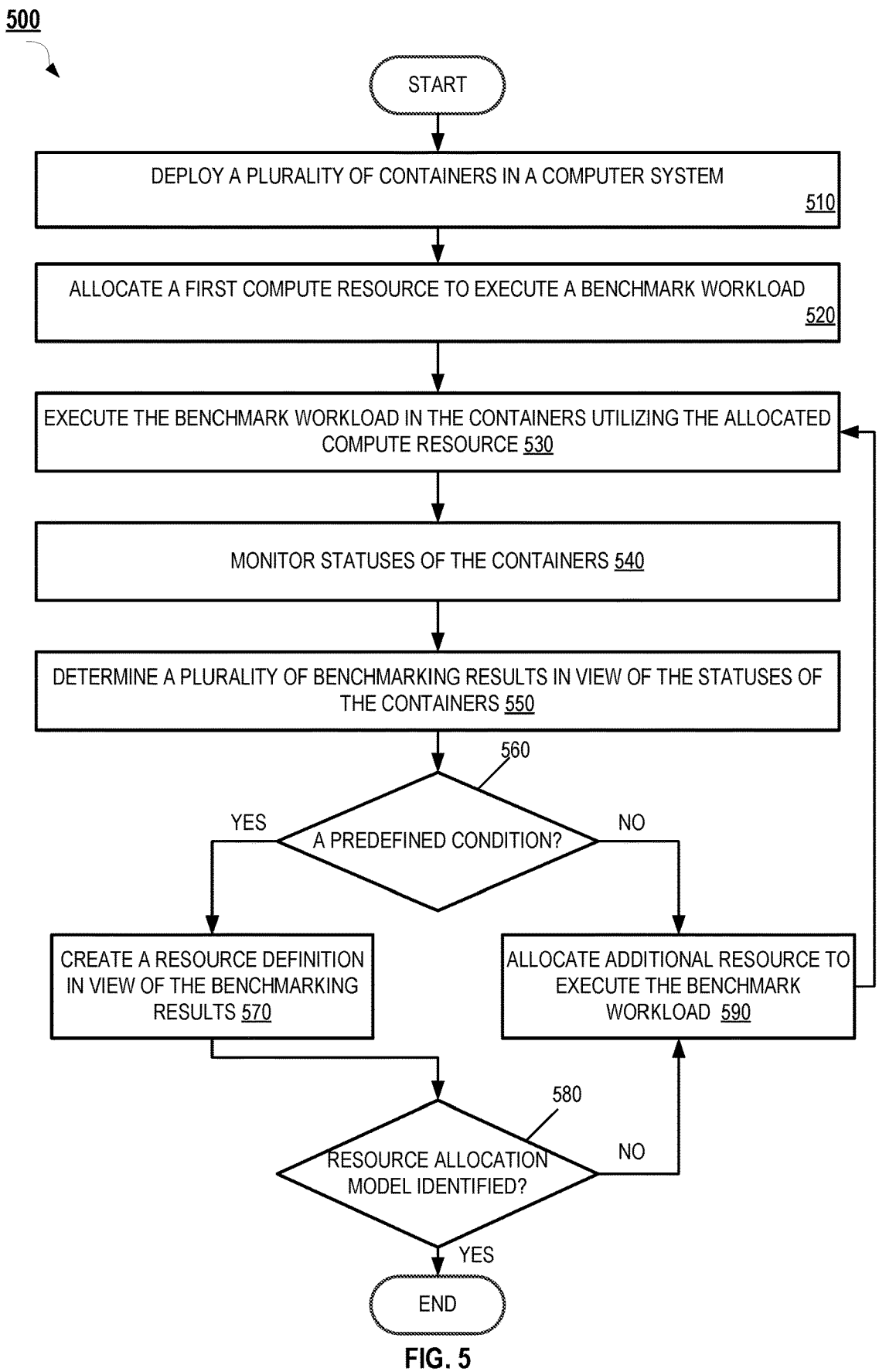
FIG. 5 is a flow diagram illustrating a method of baselining for resource allocation in a computer system according to another implementation of the disclosure.

FIG. 5 is a flow diagram illustrating a method 500 for baselining for resource allocation in a computer system according to another implementation of the disclosure. Method 500 can be performed by processing logic that may comprise hardware (e.g., circuitry, dedicated logic, programmable logic, microcode, etc.), software (such as instructions run on a processing device), firmware, or a combination thereof. In one implementation, method 500 is performed by a processing device (e.g. a processing device 702 of FIG. 7) implementing a scheduler component as described in connection with FIGS. 1-3.

Referring to FIG. 5, method 500 may begin at block 510 where a processing device can deploy a plurality of containers in a computer system. For example, one or more containers can be deployed on each of a plurality of nodes of the computer system. In some embodiments, a group of containers (e.g., a pod) can be deployed on each node of the computer system or each of a selected set of the nodes. In one implementation, each of the containers may be a copy of a template container. For example, each of the containers may be created in view of a container manifest defining the template container. In some embodiments, each of the containers may be created in view of the same container image. In another implementation, the containers may be deployed as a plurality of groups of containers (e.g., pods) in the computer system. The processing device may also allocate certain compute resources to each of the containers (e.g., a processing resource, a memory resource, etc.). Each of the groups of containers may be a copy of a template pod. For example, each of the groups of containers may be created in view of the same container manifest that defines the template pod. The container manifest defining the template pod may include one or more configuration files that define the template pod and/or each container in the template pod. The configuration files may include one or more YAML files, JavaScript Object Notation (JSON) files, etc. The configuration files may include identifying information of one or more container images that can be used to deploy one or more containers in the group of containers.

At block 520, the processing device can allocate a first compute resource to execute a benchmark workload in the containers. The first compute resource may be and/or include a first processing resource (e.g., one CPU core), a first memory resource (e.g., 1G memory), and/or any other compute resource.

At block 530, the processing device can execute the benchmark workload in the containers utilizing the allocated compute resource. In one implementation, the processing device can run the benchmark workload in each of the containers. As another example, the processing device can run the benchmark workload in each of a plurality of groups of containers (e.g., each of a plurality of pods).

In some embodiments, the processing device can execute the benchmark workload multiple times (e.g., a threshold number of times). For example, the processing device can execute the benchmark workload in a certain number of containers or groups of containers. As another example, the processing device can execute the benchmark workload in each of the containers and/or groups of containers multiple times.

At block 540, the processing device can monitor statuses of the containers (e.g., container statuses). The container statuses may be and/or include data about resource utilization, runtime durations, and/or any other data related to the execution of the benchmark workload in the containers. For example, the container statuses may include data about resource utilization, runtime durations, and/or any other data about an execution of the benchmark workload in a container or a group of containers. The container statuses may include data about multiple executions of the benchmark workload in one or more containers or groups of containers.

At block 550, the processing device can determine a plurality of benchmarking results in view of the container statuses. Each of the benchmarking results may indicate performance of one or more of the containers and/or groups of containers (e.g., pods) that run the benchmark workload utilizing the allocated compute resource. In some embodiments, a benchmarking result may be determined for each of the containers and/or groups of containers running the benchmark workload applying SPECint, SPECfp, and/or any other benchmark.

At block 560, the processing device can determine whether the benchmarking results satisfy a predefined condition. The satisfaction of the predefined condition may indicate that the computer system may achieve predictable and reliable performance (e.g., a particular performance score using a particular benchmark) utilizing the allocated compute resource. For example, the predefined condition can be that the benchmarking results fall in a predefined range. As another example, the predefined condition may be that a deviation of the benchmarking results (e.g., a standard deviation, a squared deviation, a variance, etc.) is not greater than a threshold.

In response to determining that the benchmarking results satisfy the predefined condition, the processing device can proceed to block 570 and can create a resource definition in view of the benchmarking results. For example, the processing device can determine a performance score in view of the benchmarking results. In a more particular example, the processing device can determine the performance score by calculating a mean, median, mode, and/or any other value that can represent an average value of the benchmarking results. In another more particular example, the processing device can designate one of the benchmarking results as being the performance score. In still another more particular example, the processing device can select one or more of the benchmarking results and can calculate the performance score in view of the selected benchmarking results (e.g., by determining a mean, median, mode, etc. of the selected benchmarking results).

The processing device can then generate a resource allocation unit including the performance score and associate the resource allocation unit with the allocated resource. The processing device can further generate the resource definition to indicate such association. The resource definition may also include information about the benchmarking workload, such as identifying information of a benchmarking standard that defines the benchmark workload (e.g., SPECint, SPECfp).

At block 580, the processing device can determine whether a resource allocation model is identified for the computer system. For example, the processing device can determine that the resource allocation model is identified in response to determining that a compute resource has been identified to provide a computing capacity corresponding to each of a plurality of predetermined resource allocation units (e.g., one or more predetermined performance scores) associated with the resource allocation model. The processing device can also determine that the resource allocation model is to be identified in response to determining that that processing device is to identify a compute resource that can provide a computing capacity corresponding to at least one of the predetermined resource allocation units.

In some embodiments, the processing device can proceed to block 590 in response to determining that the benchmarking results do not satisfy the predefined condition (e.g., "NO" at block 560) and/or that the resource allocation model is to be identified (e.g., "NO" at block 580"). At block 590, the processing device can allocate an additional compute resource to execute the benchmark workload in the containers. The additional compute resource may be and/or include any type of resources, such as a processing resource, a memory resource, etc. For example, the processing device can allocate a second compute resource to execute the benchmark workload in the containers. The second compute resource may be and/or include, for example, a second processing resource (e.g., two CPU cores), a second memory resource (e.g., 2 gigabytes of memory), a second networking resource, etc. The second compute resource may be greater than the first compute resource. For example, the second processing resource may be greater than the first processing resource. As another example, the second memory resource may be greater than the first memory resource.

The processing device can then loop back to block 530 and can execute the benchmark workload utilizing the allocated resource. For example, the processing device can execute the benchmark workload in each of the containers and/or each of groups of the containers utilizing the second compute resource. The processing device can generate a second plurality of second benchmarking results as described above. Each of the second plurality of benchmarking results may represent performance of one of the containers or one of the groups of containers utilizing the second compute resource during the execution of the benchmark workload. The processing device can also generate a second performance score in view of the second plurality of benchmarking results. The processing device can then update the resource definition to indicate an association between the second performance and the second compute resource.

In some embodiments, in response to determining that the resource allocation model is identified at block 580, the processing device can conclude process 500.

Figure 6:
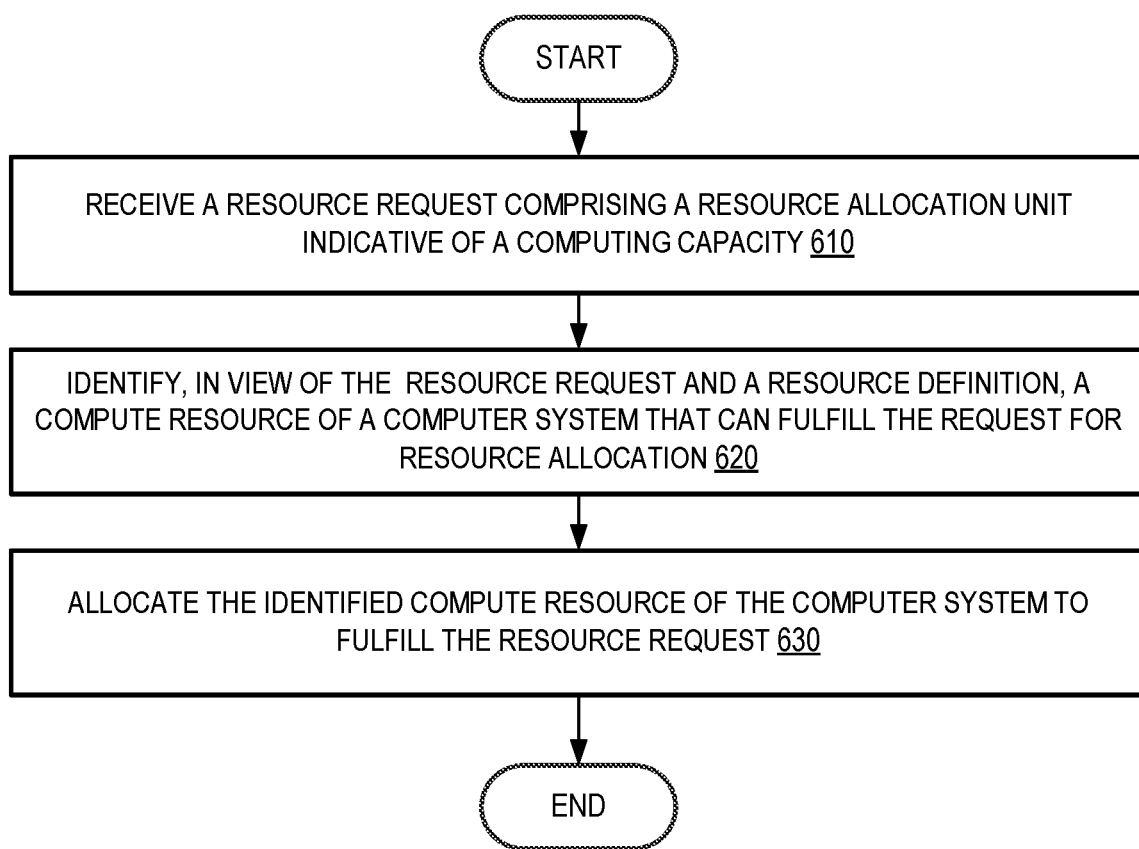
FIG. 6 is a flow diagram illustrating a method of resource allocation according to an implementation of the disclosure.

FIG. 6 is a flow diagram illustrating a method 600 for resource allocation in a computer system according to an implementation of the disclosure. Method 600 can be performed by processing logic that may comprise hardware (e.g., circuitry, dedicated logic, programmable logic, microcode, etc.), software (such as instructions run on a processing device), firmware, or a combination thereof. In one implementation, method 600 is performed by a processing device (e.g. a processing device 702 of FIG. 7) implementing a scheduler component as described in connection with FIGS. 1-3.

Referring to FIG. 6, method 600 may begin at block 610 where a processing device can receive a resource request related to a compute resource. The resource request can be and/or include a request to deploy a service, a request to deploy an application, a request to deploy a container, a request to deploy a pod, a request to execute a workload, and/or any other request including a request for the compute resource.

The resource request may include any suitable information related to the compute resource. For example, the resource request can include information that can be used to identify a certain compute resource in view of a resource definition. More particularly, for example, the resource request may include a resource allocation unit indicative of a computing capacity. The resource allocation unit may include a performance score generated in view of a benchmark. The resource request may also include information about the benchmark, such as identifying information that can be used to identify the benchmark (e.g., a description of the benchmark, a name of the benchmark, a version number of the benchmark, etc.). The performance score and/or the resource allocation unit may be generated using the benchmark as described in connection with FIGS. 4 and/or 5 above.

At block 620, the processing device can identify, in view of the resource request and a resource definition, a compute resource of a computer system that can fulfill the request. The resource definition may be generated by performing one or more operations as described in connection with FIGS. 4-5 above. The resource definition may include, for example, mapping information that can be used to map resource allocation units (e.g., performance scores) to compute resources. The processing device can convert the resource allocation unit into a compute resource of a computer system that can be utilized by the computer system to provide the computing capacity corresponding to the performance score related to the resource allocation unit.

In some embodiments, different compute resources of different computer systems may be allocated to fulfill the resource request. For example, the processing device can determine, in view of a first resource definition associated with a first computer system, that a first compute resource of the first computer system corresponds to the performance score. The processing device can further determine that the first computer system is capable of providing the computing capacity corresponding to the performance score utilizing the first compute resource. As another example, the processing device can determine, in view of a second resource definition associated with a second computer system, that a second compute resource of the second computer system corresponds to the performance score. The processing device can further determine that the second computer system is capable of providing the computing capacity corresponding to the performance score utilizing the second compute resource. The second compute resource may or may not be the same as the first compute resource. In some embodiments, the second compute resource is different from the first compute resource. As such, the processing device can allocate different compute resources of different computer systems to provide the same computing capacity corresponding to the performance score in the resource request. The processing device can thus provide consistent and predictable resource allocation in a heterogeneous environment including various resources provided by various resource providers (e.g., cloud providers).

At block 630, the processing device can allocate the compute resource of the computer system to fulfill the resource request. For example, the processing device can deploy a container on a node of the computer system and can allocate the compute resource to the container. As another example, the processing device can allocate the compute resource to a virtual machine running in the computer system.

FIG. 7 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 includes a processing device 702 (e.g., processor, CPU, etc.), a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 708.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 400 may further include a network interface device 722 communicably coupled to a network 764. The computer system 400 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a machine-accessible storage medium 724 on which is stored software 726 embodying any one or more of the methodologies of functions described herein. The software 726 may also reside, completely or at least partially, within the main memory 704 as instructions 726 and/or within the processing device 702 as processing logic 726 during execution thereof by the computer system 400; the main memory 704 and the processing device 702 also constituting machine-accessible storage media.

The machine-readable storage medium 724 may also be used to store instructions 726 to manage thread pools, such as the scheduler component 142 as described with respect to FIGS. 1-3, and/or a software library containing methods that call the above applications. While the machine-accessible storage medium 724 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Other computer system designs and configurations may also be suitable to implement the system and methods described herein. The following examples illustrate various implementations in accordance with one or more aspects of the present disclosure.

Example 1 is a method comprising: deploying a plurality of containers on a plurality of nodes of a computer system; executing, in the plurality of containers, a benchmark workload utilizing a first compute resource; obtaining a first plurality of benchmarking results representing performance of the containers utilizing the first compute resource; and creating, by a processing device, a resource definition in view of the first plurality of benchmarking results, wherein the resource definition comprises a first resource allocation unit indicative of a first computing capacity of the computer system utilizing the first compute resource and an association between the first resource allocation unit and the first compute resource.

Example 2 is the method of example 1, wherein the resource definition further comprises identifying information of a benchmark that defines the benchmark workload.

Example 3 is the method of example 1, wherein creating the resource definition comprises: in response to determining that the first plurality of benchmarking results satisfies a predefined condition, determining a first performance score in view of the first plurality of benchmarking results, wherein the first resource allocation unit comprises the first performance score.

Example 4 is the method of example 3, wherein determining the first performance score in view of the first plurality of benchmarking results comprises determining an average value of the first plurality of benchmarking results.

Example 5 is the method of example 3, wherein the predefined condition comprises at least one of that the first plurality of benchmarking results falls within a predefined range or that a deviation of the first plurality of benchmarking results is not greater than a threshold.

Example 6 is the method of example 1, further comprising receiving a request for resource allocation comprising the first resource allocation unit; determining, in view of the resource definition, that the computer system provides the first computing capacity utilizing the first compute resource; and allocating the first compute resource to fulfill the request for resource allocation.

Example 7 is the method of example 1, further comprising: executing, in the plurality of containers, the benchmark workload utilizing a second compute resource; obtaining a second plurality of benchmarking results representing performance of the containers utilizing the second compute resource; and creating the resource definition in view of the second plurality of benchmarking results, wherein the resource definition comprises a second resource allocation unit indicative of a second computing capacity of the computer system utilizing the second compute resource and an association between the second performance score and the second compute resource.

Example 8 is the method of example 7, wherein the first compute resource comprises a first processing resource, and wherein the second compute resource comprises a second processing resource.

Example 9 is the method of example 7, wherein the first compute resource comprises a first memory resource, and wherein the second compute resource comprises a second memory resource.

Example 10 is the method of example 1, further comprising monitoring resource utilization of the containers and runtime durations of executions of the benchmark workload in the containers to generate the first plurality of benchmarking results.

Example 11 is a method comprising: running, on a plurality of nodes of a computer system, a benchmark workload utilizing a plurality of compute resources; generating, by a processing device, a plurality of benchmarking results representing performance of the computer system utilizing the plurality of compute resources; and creating, by the processing device, a resource definition for the compute system in view of the benchmarking results, wherein the resource definition comprises a first resource allocation unit indicative of a first computing capacity of the computer system utilizing a first compute resource and a second resource allocation unit indicative of a second computing capacity of the computer system utilizing a second compute resource, and wherein the plurality of compute resources comprises the first compute resource and the second compute resource.

Example 12 is the method of example 11, wherein the resource definition further comprises mapping data indicative of a first association between the first resource allocation unit and the first compute resource and a second association between the second resource allocation unit and the second compute resource.

Example 13 is the method of example 11, wherein the resource definition further comprises identifying information of a benchmark related to the benchmark workload.

Example 14 is the method of example 11, wherein generating the plurality of benchmarking results comprises generating a first plurality of benchmarking results representing performance of the computer system utilizing the first compute resource.

Example 15 is the method of example 11, further comprising: in response to determining that the first plurality of benchmarking results fall within a predefined range, determining a first performance score in view of the first plurality of benchmarking results, wherein the first resource allocation unit comprises the first performance score.

Example 16 is the method of example 11, wherein the first compute resource comprises a first processing resource, and wherein the second compute resource comprises a second processing resource.

Example 17 is the method of example 11, wherein the first compute resource comprises a first memory resource, and wherein the second compute resource comprises a second memory resource.

Example 18 is the method of example 11, further comprising: deploying a plurality of containers on the plurality of computer nodes, wherein running, on the plurality of nodes of the computer system, the benchmark workload utilizing the plurality of compute resources comprises executing the benchmark workload in each of the plurality of containers utilizing the plurality of compute resources.

Example 19 is the method of example 11, wherein running, on the plurality of nodes of the computer system, the benchmark workload utilizing the plurality of compute resources comprises executing the benchmark workload on a plurality of virtual machines utilizing the plurality of compute resources.

Example 20 is the method of example 11, further comprising: monitoring resource utilization of the nodes during the execution of the benchmark workload to generate execution data; and obtaining the plurality of benchmarking results in view of the execution data.

Example 21 is the method of example 11, further comprising: receiving a request for resource allocation comprising the first resource allocation unit; determining, in view of the resource definition, that the computer system can provide the first computing capacity utilizing the first compute resource; and allocating the first compute resource to fulfill the request for resource allocation.

Example 22 is a method comprising: receiving a request for resource allocation comprising a resource allocation unit indicative of a computing capacity; determining, by a processing device, a first compute resource of a first computer system in view of a first resource definition related to the first computer system, wherein the first resource definition comprises data indicative of an association between the first compute resource and the resource allocation unit; and allocating the first compute resource to fulfill the request for resource allocation.

Example 23 is the method of example 22, wherein the resource allocation unit comprises a performance score generated in view of a benchmark, and wherein the resource request further comprises identifying information of the benchmark.

Example 24 is the method of example 22, wherein determining the first compute resource comprises: determining, in view of the first resource definition, that the first computer system provides the computing capacity utilizing the first compute resource.

Example 25 is the method of example 22, wherein the first computer system is a virtualized computer system.

Example 26 is the method of example 22, wherein allocating the first compute resource comprises: deploying a container on a node of the first computer system; and allocating the first compute resource to the container.

Example 27 is the method of example 22, wherein allocating the first compute resource comprises: allocating the first compute resource to a virtual machine running on the computer system.

Example 28 is the method of example 22, further comprising: identifying, by the processing device, a second compute resource of a second computer system in view of the resource allocation unit and a second resource definition associated with the second computer system, wherein the second resource definition comprises data indicative of an association between the second compute resource and the resource allocation unit; and allocating the second compute resource to fulfill the request for resource allocation.

Example 29 is the method of example 28, wherein the first compute resource comprises a first processing resource, and wherein the second compute resource comprises a second processing resource.

Example 30 is the method of example 28, wherein the first compute resource comprises a first memory resource, and wherein the second compute resource comprises a second memory resource.

Example 31 is the method of example 30, wherein identifying the second compute resource comprises: determining, in view of the second resource definition, that the second computer system provides the computing capacity utilizing the second compute resource.

Example 32 is an apparatus comprising: a processing device; and means for running, on a plurality of nodes of a computer system, a benchmark workload utilizing a plurality of compute resources; means for generating a plurality of benchmarking results representing performance of the computer system utilizing the plurality of compute resources; and means for creating a resource definition for the compute system in view of the benchmarking results, wherein the resource definition comprises a first resource allocation unit indicative of a first computing capacity of the computer system utilizing a first compute resource and a second resource allocation unit indicative of a second computing capacity of the computer system utilizing a second compute resource, and wherein the plurality of compute resources comprises the first compute resource and the second compute resource.

Example 33 is the apparatus of example, further comprising the subject matter of any of examples 1-31.

Example 34 is a system comprising a memory and a processing device operatively coupled to the memory, the processing device to implement the method of any of examples 1-31.

Example 35 is a non-transitory machine-readable storage medium including instructions that, when accessed by a processing device, cause the processing device to implement the method of any of examples 1-31.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "assigning," "providing," "executing," "determining," "copying," "storing," "identifying," "gathering," "allocating," "associating," "identifying," "running," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    running, on a plurality of nodes of a computer system, a benchmark workload utilizing a plurality of compute resources;
    generating, by a processing device, a plurality of benchmarking results representing performance of the computer system utilizing the plurality of compute resources; and
    creating, by the processing device, a resource definition for the computer system in view of the plurality of benchmarking results, wherein the resource definition comprises a first resource allocation unit indicative of a first computing capacity of the computer system utilizing a first compute resource and a second resource allocation unit indicative of a second computing capacity of the computer system utilizing a second compute resource, and wherein the plurality of compute resources comprises the first compute resource and the second compute resource.

2. The method of claim 1, wherein the resource definition further comprises mapping data indicative of a first association between the first resource allocation unit and the first compute resource and a second association between the second resource allocation unit and the second compute resource.

3. The method of claim 1, wherein the resource definition further comprises identifying information of a benchmark related to the benchmark workload.

4. The method of claim 3, wherein generating the plurality of benchmarking results comprises generating a first plurality of benchmarking results representing performance of the computer system utilizing the first compute resource.

5. The method of claim 4, further comprising:
    in response to determining that the first plurality of benchmarking results fall within a predefined range, determining a first performance score in view of the first plurality of benchmarking results, wherein the first resource allocation unit comprises the first performance score.

6. The method of claim 1, wherein the first compute resource comprises a first processing resource, and wherein the second compute resource comprises a second processing resource.

7. The method of claim 1, wherein the first compute resource comprises a first memory resource, and wherein the second compute resource comprises a second memory resource.

8. The method of claim 1, further comprising:
    deploying a plurality of containers on the plurality of computer nodes, wherein running, on the plurality of nodes of the computer system, the benchmark workload utilizing the plurality of compute resources comprises executing the benchmark workload in each of the plurality of containers utilizing the plurality of compute resources.

9. The method of claim 1, wherein running, on the plurality of nodes of the computer system, the benchmark workload utilizing the plurality of compute resources comprises executing the benchmark workload on a plurality of virtual machines utilizing the plurality of compute resources.

10. The method of claim 1, further comprising:
    monitoring resource utilization of the nodes during the execution of the benchmark workload to generate execution data; and obtaining the plurality of benchmarking results in view of the execution data.

11. A non-transitory machine-readable storage medium including instructions that, when accessed by a processing device, cause the processing device to:
    run, on a plurality of nodes of a computer system, a benchmark workload utilizing a plurality of compute resources;
    generate a plurality of benchmarking results representing performance of the computer system utilizing the plurality of compute resources; and
    create a resource definition for the computer system in view of the plurality of benchmarking results, wherein the resource definition comprises a first resource allocation unit indicative of a first computing capacity of the computer system utilizing a first compute resource and a second resource allocation unit indicative of a second computing capacity of the computer system utilizing a second compute resource, and wherein the plurality of compute resources comprises the first compute resource and the second compute resource.

12. The non-transitory machine-readable storage medium of claim 11, wherein the resource definition further comprises mapping data indicative of a first association between the first resource allocation unit and the first compute resource and a second association between the second resource allocation unit and the second compute resource.

13. A system comprising:
    a memory; and
    a processing device, coupled to the memory to:
        run, on a plurality of nodes of a computer system, a benchmark workload utilizing a plurality of compute resources;

generate a plurality of benchmarking results representing performance of the computer system utilizing the plurality of compute resources; and create a resource definition for the computer system in view of the plurality of benchmarking results, wherein the resource definition comprises a first resource allocation unit indicative of a first computing capacity of the computer system utilizing a first compute resource and a second resource allocation unit indicative of a second computing capacity of the computer system utilizing a second compute resource, and wherein the plurality of compute resources comprises the first compute resource and the second compute resource.

14. The system of claim 13, wherein the resource definition further comprises mapping data indicative of a first association between the first resource allocation unit and the first compute resource and a second association between the second resource allocation unit and the second compute resource.

15. The system of claim 13, wherein the resource definition further comprises identifying information of a benchmark related to the benchmark workload.

16. The system of claim 15, wherein to generate the plurality of benchmarking results, the processing device is to generate a first plurality of benchmarking results representing performance of the computer system utilizing the first compute resource.

17. The system of claim 16, wherein the processing device is further to:
in response to determining that the first plurality of benchmarking results fall within a predefined range, determine a first performance score in view of the first plurality of benchmarking results, wherein the first resource allocation unit comprises the first performance score.

18. The system of claim 13, wherein the first compute resource comprises a first processing resource, and wherein the second compute resource comprises a second processing resource.

19. The system of claim 13, wherein the first compute resource comprises a first memory resource, and wherein the second compute resource comprises a second memory resource.

20. The system of claim 13, wherein the processing device is further to:
deploy a plurality of containers on the plurality of computer nodes, wherein to run, on the plurality of nodes of the computer system, the benchmark workload utilizing the plurality of compute resources, the processing device is further to execute the benchmark workload in each of the plurality of containers utilizing the plurality of compute resources.

* * * * *